United States Patent [19]
Sanderson

[11] Patent Number: 6,040,759
[45] Date of Patent: *Mar. 21, 2000

[54] COMMUNICATION SYSTEM FOR PROVIDING BROADBAND DATA SERVICES USING A HIGH-VOLTAGE CABLE OF A POWER SYSTEM

[76] Inventor: Lelon Wayne Sanderson, 55 Spray Rd., Fayetteville, Tenn. 37334

[*] Notice: This patent issued on a continued prosecution application filed under 37 CFR 1.53(d), and is subject to the twenty year patent term provisions of 35 U.S.C. 154(a)(2).

[21] Appl. No.: 09/025,044

[22] Filed: Feb. 17, 1998

[51] Int. Cl.[7] .................................................. H04M 11/04
[52] U.S. Cl. ............................... 340/310.01; 340/310.05; 340/310.06; 375/259; 455/3.3
[58] Field of Search ......................... 340/310.01, 310.02, 340/310.05, 310.06, 310.07, 310.08, 870.01; 455/3.3, 6.3; 375/259

[56] References Cited

U.S. PATENT DOCUMENTS

| | | |
|---|---|---|
| 4,142,178 | 2/1979 | Whyte . |
| 4,471,399 | 9/1984 | Udren . |
| 4,757,495 | 7/1988 | Decker et al. ............................. 370/76 |
| 5,323,460 | 6/1994 | Warner et al. ........................... 379/399 |
| 5,625,863 | 4/1997 | Abraham ............................ 340/310.01 |
| 5,644,573 | 7/1997 | Bingham et al. ....................... 379/503 |
| 5,684,450 | 11/1997 | Brown ................................ 340/310.02 |
| 5,699,276 | 12/1997 | Roos .................................... 364/514 A |
| 5,729,370 | 3/1998 | Bernstein et al. ...................... 359/118 |
| 5,774,500 | 6/1998 | Zogakis et al. ......................... 375/261 |
| 5,777,769 | 7/1998 | Coutinho ............................ 340/310.01 |
| 5,835,321 | 11/1998 | Elms et al. ................................. 361/45 |

OTHER PUBLICATIONS

U.S. application No. 08/812,793, Sanderson, filed Mar. 6, 1997.
Bernard Sklar, *Digital Communications Fundamentals and Applications* by 1988 pp. 127–131.
Irving Kalet, "The Multitone Channel", IEEE Transactions on Communications, vol. 37, No. 2, Feb. 1989, pp. 119–124.
Sorbara, et. al., "Carrierless AM/PM", T1E1.4/90–154, Sep. 24, 1990 (An ANSI standards meeting open to the public).
J.M. Cioffi, et. al., "Discrete Multitone Transceivers for E1–HDSL", T1E1.4/92–75, May 18, 1992.

*Primary Examiner*—Jeffery A. Hofsass
*Assistant Examiner*—Van T. Trieu
*Attorney, Agent, or Firm*—Curtis W. Dodd

[57] ABSTRACT

A communication system is disclosed for providing broadband multimedia services using one or more high-voltage cables of a power distribution network, while the power distribution network is supplying electrical power. A radio-frequency signal at a first location is coupled to the high-voltage cable, transported over the high-voltage cable, and then coupled from the high-voltage cable at a second location. The radio-frequency signal at the first location is modulated with information and demodulated at the second location, thereby providing broadband multimedia service between the two locations. The broadband multimedia communications system may be used for a variety of communication needs, such as telephone service, video service, internet service, and other services requiring high-speed data transfers.

18 Claims, 6 Drawing Sheets

COMMUNICATION SYSTEM FOR PROVIDING BROADBAND DATA SERVICES USING A HIGH-VOLTAGE CABLE OF A POWER SYSTEM

FIELD OF THE INVENTION

This application relates to providing broadband communications services using one or more high-voltage cables of a power distribution network, while the power distribution network is supplying electrical power. A radio-frequency signal at a first location is modulated with a data signal and coupled to a high-voltage cable serving as a transmission channel. At a second location the radio-frequency signal is coupled from the high-voltage cable to a demodulator for converting the modulated signal back to a data signal. Data is sent from the second location to the first location in a similar manner typically using a different band of frequencies. This full-duplex broadband service between the locations may simultaneously supply a variety of communication needs, such as telephone service, video service, internet service, and other services requiring high-speed data transfers.

BACKGROUND OF THE INVENTION

As demand for information services has increased over the last decade, technical improvements have occurred in order to meet the demand. Approximately ten years ago a modem, typically at that time a commercial product, provided data transfer rates of around 2.4 kilobits per second ("KBPS") over an analog telephone line. Currently high-speed modems or ISDN terminal adapters coupled over a public switched telephone network provide data transfer rates of between 28.8 and 128 KBPS for both commercial and residential customers. Internet service providers are currently seeking technology that will furnish customers with faster transfer rates for reducing download time. In addition the evolution of digital television and other video developments have increased the demand for even higher data transfer rates, such as for example, several megabits per second ("MBPS"). These higher data transfer rates are sometimes called "broadband service" or MBPS service. The MBPS service typically provides for both upstream and downstream data transfer and may be referred to as interactive broadband service ("IBS"). An example is asymmetric digital subscriber line ("ADSL") service over twisted pair wires of the telephone companies, where the down stream rates may be 6 MBPS and the upstream rates may be around 1 MBPS.

The 1996 Telecommunications Deregulation Act encouraged a variety of providers to compete for IBS. The providers currently considered as leaders in meeting the IBS needs of consumers include long distance carriers, local phone companies, and cable companies. In order to provide IBS, resource sharing and partnerships may develop among a variety of businesses.

There are currently four technologies being considered as contenders to provide IBS or similar service. These technologies include methods for using the existing twisted pairs of wires in the telephone network, coaxial cables, fiber links, and wireless links. In some cases a mixture of these technologies may be used to provide IBS. A detailed discussion of these technologies can be found in the IEEE Network Magazine, Special Issue on Broadband Services to the Home, Vol. 11, No. 1, January/February, 1997. Each of these technologies shows promise towards providing IBS, but each technology has technical problems and economic constraints. An access network that can provide for a complex mix of broadband services such as a high-speed internet connection, video on demand, telecommuting, and future applications is currently being developed incorporating these four technologies. Selection of the best or optimum technology is dependent on a variety of parameters such as the infrastructure of a country, the physical environment for a new installation, the demographic diversity of users and other factors.

Although the above four technologies are expected to provide IBS to a large number of subscribers, new technologies may be capable of providing IBS technology. Currently a partnership exists between local telephone service providers and power companies. In a typical residential location, a support pole or telephone pole, is used as part of the structure for providing both power lines and telephone lines to a customer. Cable television ("CATV") providers recently joined the partnership in order to have support poles for coaxial cables. Because of recent asymmetric digital subscriber line development, some local telephone companies may be able to deliver television programming over existing and new telephone lines. Further it has been discovered that part of the excess bandwidth on television cables of CATV companies can be used to provide telephone and data service.

As power companies look for new uses of the power system network and demands for data bandwidth increase, the use of power system networks may be a means for providing IBS. Currently, existing power line communication systems are limited to low-speed data used for monitoring and controlling functions in the power system network. These existing systems are called power line carrier communication systems. Typically, power line carrier communications systems use conventional high-voltage transformers to couple communications signals to and from the high-voltage lines of a power system. The high-voltage transformers are expensive and typically limited to coupling signals having frequencies between 30 Hertz and 50 kilohertz. Some newer power line carrier systems, such as described by in U.S. Pat. No. 4,142,178, use high breakdown voltage capacitors to couple onto the high voltage lines and operate at frequencies up to about 300 kilohertz. These newer power line carrier communications systems use narrow bandwidth carriers and provide only low-speed data. Because of cost and data bandwidth limitations, present power line carrier communication systems are not suitable for providing IBS.

In order for a high-voltage cable to serve as communication channels for IBS there are a variety of problems to consider. For a high-voltage cable to provide high-speed data there must be an apparatus and method for converting data streams to a signal suitable for transmission over the high-voltage cables. Such an apparatus, method or system should not compromise the power delivery abilities of the power system. In addition, such an apparatus, method or system must be capable of operating with and adapting to a wide variation in communication channel impairments. Power delivery loads and particularly changes in loads must not affect the transmission of information on the high-voltage cable. In addition, such an apparatus must be inexpensive, small, environmentally acceptable, essentially maintenance free and easy to install in order to compete with contending technologies. Such an apparatus must also guarantee safety by isolating the communications function from the high-voltage power delivery at the customer's premise.

DESCRIPTION OF THE PREFERRED EMBODIMENT

Figure 1:
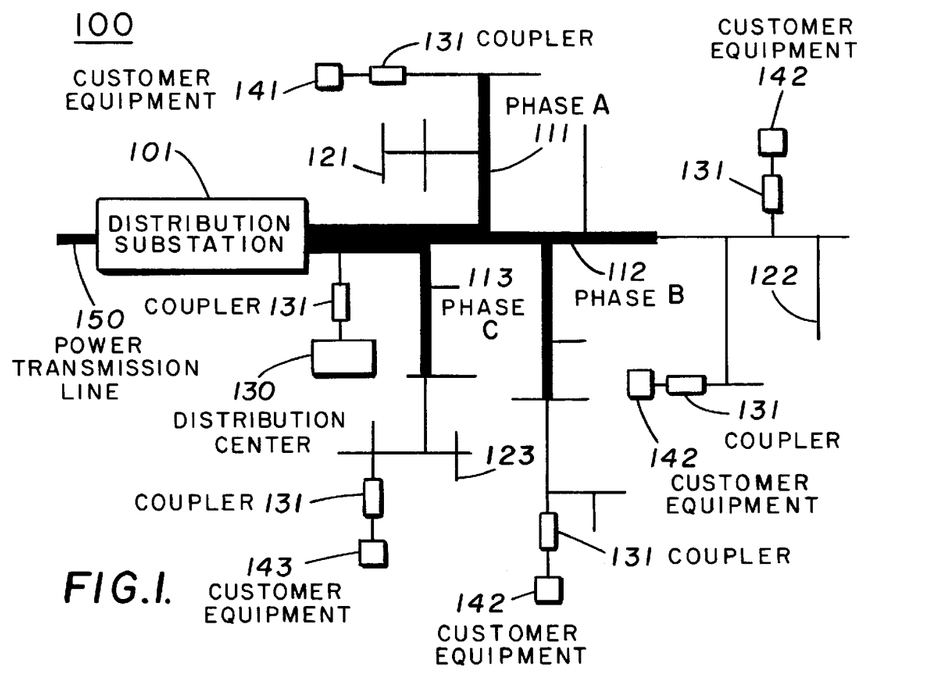
FIG. 1 illustrates a data communication system for providing communication services over high-voltage cables of a power distribution network.

An electrical power network is comprised of generators, transformers, transmission lines, and other components. A power distribution network is a part of the electrical power network that provides electrical energy to customers. FIG. 1 illustrates a power distribution network 100 having additional components serving to provide for high-speed data transfers in accordance with the present invention.

A distribution substation 101 furnishes distribution voltages to high-voltage cables where each high-voltage cable typically provides electrical power to 500 to 1500 customers. The distribution voltages are typically three phase alternating current ("AC") voltages of around 7,200 volts. The distribution substation typically receives power at higher voltages, such as 25 kilovolts to 160 kilovolts, from a power system transmission line 150. Each of the three-phase AC voltages, phase A, phase B, and phase C are respectively assigned to high-voltage cables 111, 112, 113. Each of the three phase AC voltages provides power to customers at customer locations. For example, phase A provides electrical power to customer location 121, phase B to customer location 122, and phase C to customer location 123. The customer locations 121, 122, and 123 do not have the additional components necessary to serve as part of a high-speed data network. At the customer locations a step-down transformer (not shown) lowers the voltages to values of around 110 volts line to neutral and 220 volts line to line in a 3-wire single phase connection to the customer residence.

The power distribution network may also provide high-speed data communication services in accordance with the present invention with the addition of distribution data equipment at the distribution center 130 and customer data equipment 141, 142, 143 at customer locations. The data distribution equipment and the customer data equipment are coupled to the high-voltage cables using a coupler 131. The coupler 131 is described in application Ser. No. 08/812,793 filed on Mar. 6, 1997 by the inventor and is hereby incorporated by reference herein. The distribution center receives media information, such as analog television signals, digitized television signals, telephone signals, internet protocol data, audio signals, and other high-speed data signals from sources which may include phone companies, television broadcasters, internet service providers, video conference providers, and other service providers. All of the services provided by the media information are collectively referred to as multimedia services and the sources are collectively referred to as media sources. Distribution data equipment typically receives data from multimedia information sources over connections such as wide area networks using twisted pair cables, coaxial cables, fiber optical cables, wireless RF links, or direct satellite feeds. In addition, the distribution data equipment at distribution center 130 may receive multimedia information from service providers or customer data equipment over the power transmission lines 150 using a variation of the present invention. Service providers could also furnish service over the high-voltage cable 111 that the customers share. For example, a customer may request, over a high-speed data connection, a video conference setup through distribution data equipment located at the distribution center 130. Upon receiving the request the distribution data equipment must process the request based on a predetermined protocol and forward information to the appropriate service provider. The distribution data equipment would then establish the negotiated service connections. Details of the data communication system in accordance with the present invention are given in FIG. 3 and will be described later.

Figure 2:
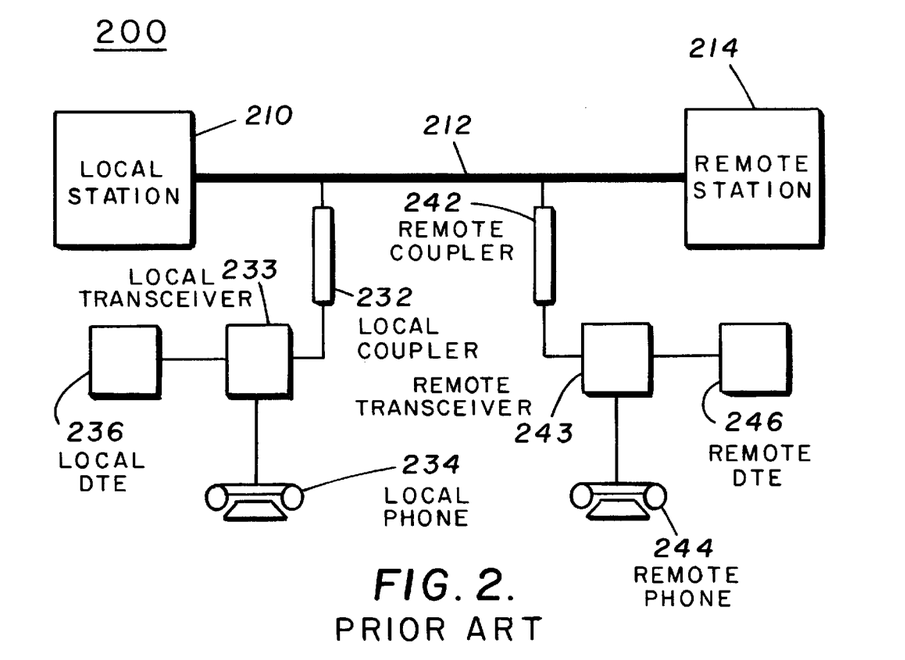
FIG. 2 is a representation of a prior art communications system using elements of a power network.

FIG. 2 illustrates a power network communication system 200, a prior art apparatus, that provides phone and data transfer services. The power network communication system 200, typically referred to as a power line carrier system is used to transfer data between a local station 210, using a high-voltage power cable 212, and a remote station 214. The data rates in the power line carrier system are low-speed and are not capable of providing high-speed data service, such as IBS, between the local station 210 and remote station 214. A local coupling device 232 and a remote coupling device 242 each have a high-voltage terminal connected to the high-voltage power cable 212. A second terminal of the coupling devices 232, 242 are respectively connected to a local transceiver 233 and a remote transceiver 243. The combination of the transceivers, coupling devices, and the high-voltage power cable provide an analog coupling network for a telephone connection and a data link for an instrument connection. The telephone connection is provided using a local telephone 234 and a remote telephone 244. A local data terminal equipment ("DTE") 236 can transfer and receive information from a remote DTE 246. Power line carrier systems have been used by the power industry for over thirty years and have served to provide for voice communications and low data rate applications. Some variations of the power line carrier system are described in U.S. Pat. No. 4,142,178 issued to Whyte et. al.

The coupling devices 232, 242 are typically low-frequency transformers typically passing signals between 30 Hertz and 50 Kilohertz. Other systems use capacitors in the coupling devices and work with carrier frequencies up to about 300 kilohertz. The low-frequency transformers are designed for isolating and protecting personnel and equipment from any over voltages or high-voltage transients that may be present on the high-voltage cables. The low bandwidth of the low frequency transformers makes them unsuitable for transmission of video or high-speed data transfers between the distribution substation 101 and the customer's premise 141. Because the power line carrier system has met most of the communications and control needs of the power industry there has been little incentive for increasing the bandwidth of such systems. Power line carrier communications systems that use capacitive coupling, such as described by Whyte, do not address high-speed data rates capable of providing IBS over the power lines. In power system networks requiring high-speed data transfers, power companies have selected other data transfer means, such as microwave links, dedicated fiber optics, coaxial cables, or leased lines.

Figure 3:
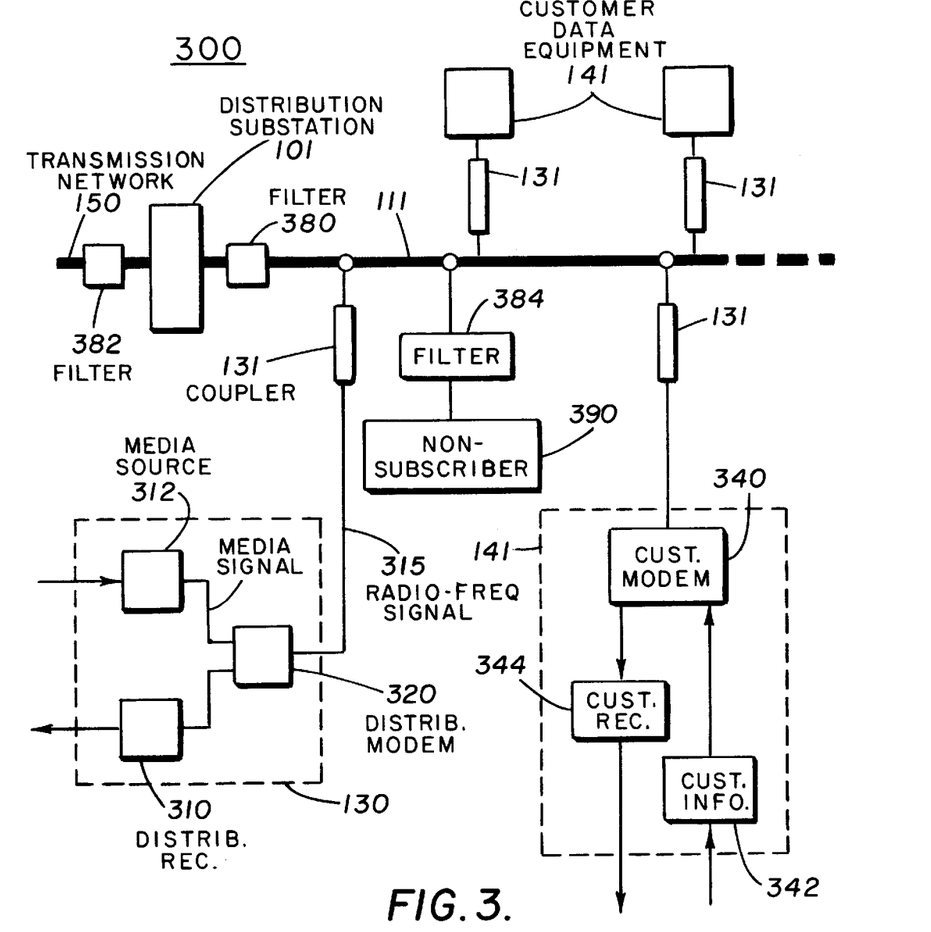
FIG. 3 illustrates details of a data communication system for providing communication services over high-voltage cables of a power network in accordance with the present invention.

FIG. 3 illustrates a multimedia communications system 300 in accordance with the present invention. The multimedia communication system provides for transfer of video, telephony, or data communication service between customer locations and the distribution center 130. When a variety of services are provided a media source 312 has a media signal 314 containing information from several service providers. In the case of digital data communications the media source is considered a data source having downstream data to be transferred to customer locations. The media signal which may contain a data stream and an analog signal is coupled to a distribution modem 320. The distribution modem modulates the data stream and converts the analog signal to a different frequency band thereby generating a RF signal 315. The RF signal is then coupled to the high-voltage cable 111 using coupler 131. The RF signal travels down the high-voltage cable and is coupled, using another coupler 131, to customer equipment 141. A customer modem 340 demodulates the RF signal and sends the demodulated signal to a customer receiver 344. The customer equipment has a customer information source 342 coupled to the customer modem for sending information to the distribution center. Customer information includes email, video, telephone, requests for programs from the media source, and information for other services.

The RF signal 315 coupled to the high-voltage cable 111 flows towards both the distribution substation 101 and the customer equipment 141. In order to keep the RF signal from entering the power grid through distribution substation 101 a distribution bandstop filter 380 is placed between coupler node 330 and the distribution substation, although many of the power system elements inherently suppress RF signals. A transmission bandstop filter 382 placed on the other side of the distribution substation serves as another means for isolating the multimedia communications system from interfering signals. It also may be necessary to raise the impedance seen by the RF signal toward the distribution substation 101 in order for most of the coupled power to be transmitted downstream along the high-voltage cable 111.

Circuit loads not related to the communications, such as power factor correction capacitors or power customer connections not receiving communications connections such as those at 121, 122, and 123 of FIG. 1, along the distribution circuit may need to be RF isolated for the improved transmission of RF signals along the high-voltage cable. This might include placement of bandstop filters or ferrite inductive elements on drop wires which connect the non-communications power loads to the high voltage cable. An example of an arrangement for RF isolation of a non-subscriber 390 is shown in FIG. 3. A non-subscriber bandstop filter 384 is coupled to the high-voltage cable 111 to help direct the energy in the RF signal to subscribing customers. Additional isolation devices might optionally be placed on pole ground conductors below the neutral conductor connections in order to improve RF transmission efficiencies.

The customer terminal 141, 142, 143 of FIG. 1, also provides upstream data in order to allow the customer to initiate a desired service, such as, for example video on demand. Upstream data is coupled to the remote modem where a modulator generates an upstream RF signal. The upstream RF signal is coupled to the high-voltage cable and flows towards the distribution modem. After the upstream RF signal is coupled to the distribution modem, a demodulator in the distribution modem demodulates the upstream RF signal to provide upstream data for the data distribution center. The upstream data may contain information requested by the data distribution center or may be a request for a variety of services, such as phone service or a specified television program. Of course it may also contain outbound information content such as e-mail, file transfers, or one-way of 2-way duplex communications.

Figure 4:
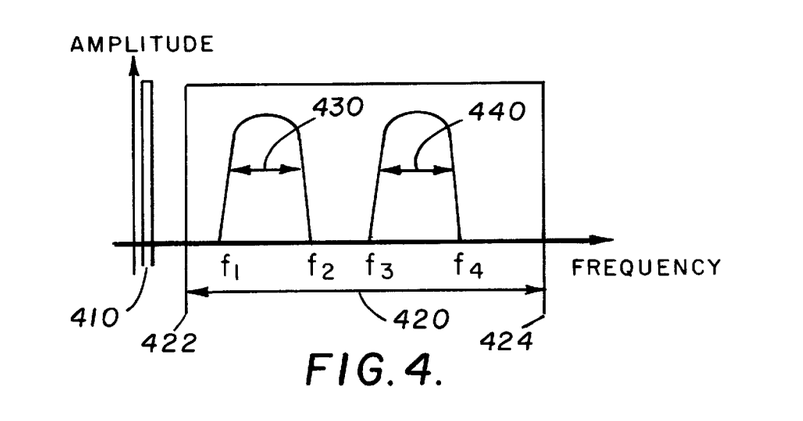
FIG. 4 shows the frequency band for providing data communication services.

Measured frequency response of the high-voltage cables indicate that the high-voltage cables may serve as a communication channel for two-way high-speed data transfer when combined with elements arranged in accordance with the present invention. FIG. 4 is a graphical illustration showing the high frequencies used by power line carrier systems 410, a prior art apparatus and the radio frequencies 420 used for the communication system in accordance with the present invention. Because of variations in measured characteristics and for pedagogical reasons the illustration is not drawn to scale. A band of frequencies for power line carrier systems, the high-frequency band 410, is shown as frequencies from near zero to 300 kilohertz. The RF band 420 of the present invention uses frequencies from around 1.0 megahertz 422 to up to about 1000 megahertz 424. A portion of the RF band 430 is set aside for upstream data and another portion 440 for downstream data. In the multimedia communication system of the present invention as applied to one particular distribution circuit, the frequency band from 15 megahertz to 50 megahertz has been used for upstream data transfers and the frequency band from 50 megahertz to 88 megahertz used for downstream data transfers. However, the exact bandwidth and assignment of channels is expected to vary with the particular power distribution, the services provided, the channel impairments, the amount and effectiveness of RF isolation devices, the distance from the distribution center to the customer, whether RF repeaters and other factors. Based on measured signal-to-noise ratios on several high-voltage cables, it was been determined that data could be transferred at up to 8 bits/hertz. This implies, for example, that more than 200 Mbps can be transferred in each direction along those cables. The 200 Mbps is equivalent to the optical fiber channel capacity designated OC-3, and shows the competitive potential for the multimedia communication system of the present invention.

The communication system may use information about channel characteristics measured by the data distribution equipment and the customer data equipment to dynamically select the best RF channels to use for a given set of services. However the invention as described does may be practiced without measuring the channel characteristics. Frequency division multiplexing is used at the data distribution center to combine signals for media sources to be used for downstream communications and the resulting RF signal is then coupled to the the high-voltage cable. Channel impairment information stored in the data distribution equipment may be used to select the best frequency bands for transferring both the upstream RF signal and the downstream RF signal. Discrete Multi-Tone ("DMT") modems currently being used for Asynchronous Digital Subscriber Line ("ADSL") are used on twisted wire pairs having channel impairments similar to the channel impairments of the high-voltage cable 111. For example, DMT modems exhibit inherent immunity to impulsive noise sources that are common on the power lines. Although the preferred modulation is DMT, other modulation techniques such as frequency shift keying ("FSK"), phase shift keying ("PSK"), carrierless amplitude modulation-phase modulation ("CAP") and quadrature amplitude modulation ("QAM") may also provide the modem function for the present invention. Each channel, frequency bands of the high-voltage cable, may have independently selected modulation methods and still remain within the scope of the present invention. When data is transferred over the high-voltage cable channel, overhead bits are added to provide for framing and forward error correction ("FEC"). Framing and are FEC techniques are well-known to those working in the data communications field.

The structure for the inventors apparatus is illustrated in FIG. 3. A field demonstration of the multimedia communication system is now briefly described. A composite RF signal from a composite modem using coupler 131 was connected to a 13.8 kv cable at a distribution substation. The composite RF signal consisted of the video and audio outputs from a VCR playing a movie. The movie was observed clearly on a TV receiver at a location at a pole located about 4000 feet from the distribution substation. The RF channels of the field demonstration were centered at 61.25 and 67.25 MHz. In a second demonstration, as an illustration of the broadband data capability, a 288 kbps PAM baseband modem was used in place of the video source as the AM modulating source on the RF carrier. The audio modulation was left as before, so that simultaneous audio and data were communicated on the same RF carrier. In addition to the communication from the substation toward the first pole, a second modulated RF carrier at a different frequency was transmitted from the first pole coupling network toward the distribution substation. Hence a full-duplex data communication having audio and video was demonstrated. The two carriers for the demonstration were TV channel 3 and TV channel 4. The data communications occupied only about 200 kilohertz of bandwidth for each direction and 288 KBPS were transmitted in each direction. With the power levels of the transmitters set at about −3 dBVrms into the coupler 131 it was demonstrated that the movie and audio had good quality.

Because a variety of existing modulation techniques can operate in the RF bands of high-voltage cables, the use of the present invention is not limited to a specific modem technology. For example modems using QPSK modulation of RF carriers may be used for a full-duplex connection. When the QPSK modems occupy about 2 Megahertz of bandwidth, data delivery is over 2 MBPS each way. Those skilled in the art of modem technology could design a variety of modems to provide high-speed data service using the high-voltage cable delivery system of the present invention.

A further benefit of the communications system has been found to be the enhanced reception of broadcast television, as though the customer premise equipment were connected to an antenna. When a television receiver is connected to coupler 131 at a customer location and the television receiver is tuned to receive a channel broadcast through the air, the television reception was found to be enhanced by the operation of the new multimedia communications system of the present invention.

Figure 5:
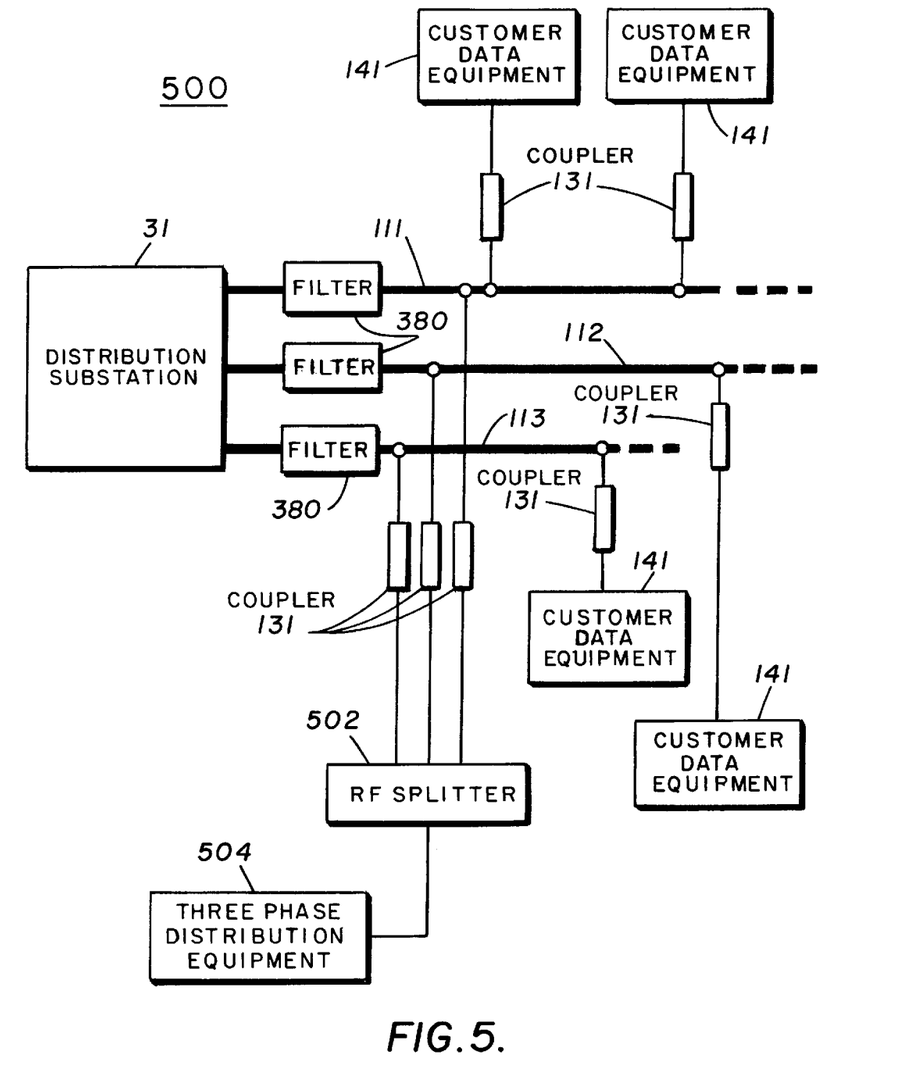
FIG. 5 is an illustration of a three-phase power distribution system for providing communication services in accordance with the present invention.

FIG. 5 illustrates a data communication system having three high-voltage cables of a power distribution network serving as the communication channel for high-speed data service. A distribution modem in three phase distribution equipment 504 is coupled to port 1 of a signal splitter 502. The RF signal from the distribution modem is divided into three signals of approximately the same strength and transferred to the three high-voltage cables for phase A, phase B, and phase C, or respectively on port A, port B, and port C. The downstream RF signal may then be received by customers on each of the three high-voltage cables by a phase A remote modem, a phase B remote modem, and a phase C remote modem. When data is sent on upstream RF signals from said remote modems, the energy in the upstream RF signals is coupled port 1 of the signal splitter. Hence the multimedia communication system simultaneously serves customers on each phase of the power distribution system. Signal splitters are well known to those skilled in the design of RF coupling devices. One component that could be used to provide phase splitting is available from Magnavox as their part number M61001.

Figure 6:
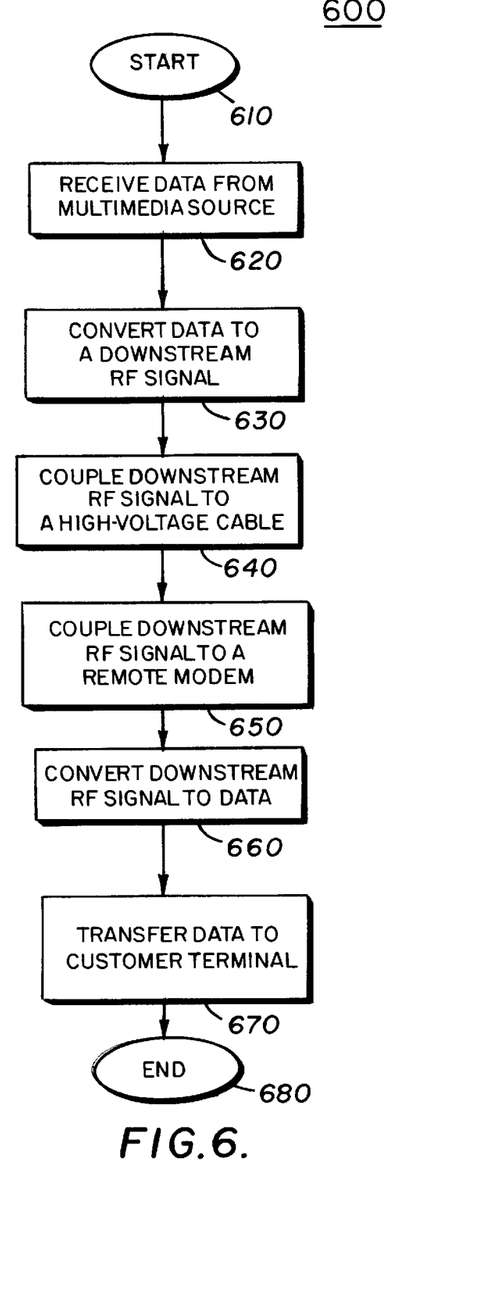
FIG. 6 is a flow chart illustrating a method for providing downstream data transfer in a data communication system.

FIG. 6 is a flow chart illustrating a method for transferring data from a data source to a customer terminal where a high-voltage cable is a communication channel. First, step 610, the distribution modem receives multimedia data, and then converts the data to a downstream RF signal, step 620. A coupler then couples the downstream RF signal to a high-voltage cable, step 630. At a customer location a coupler couples the downstream RF signal to a remote modem, step 640. The downstream RF signal is then converted to data, step 650. The data is then transferred to the customer terminal, step 660. Next the data is processed by the customer terminal and directed to an application service at the customer's location.

Figure 7:
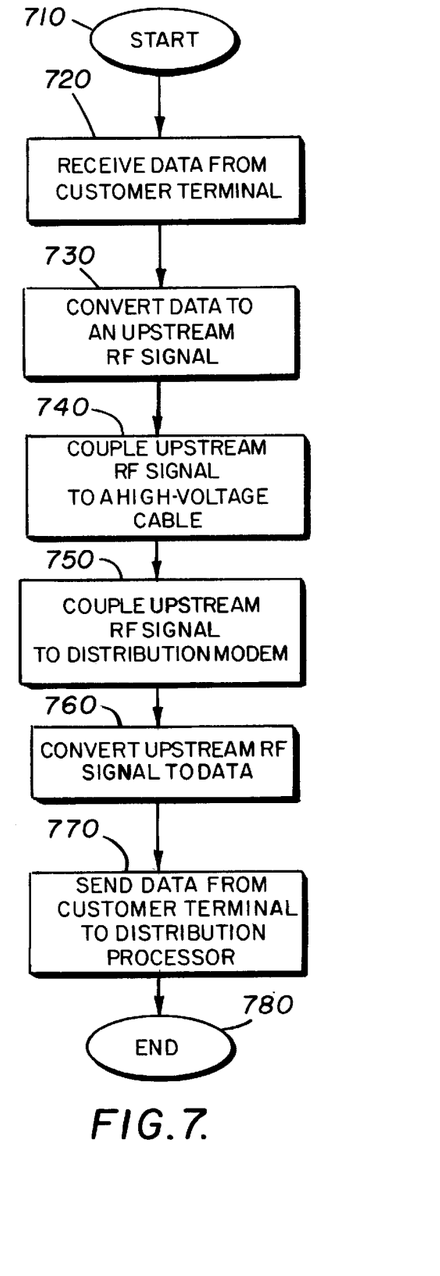
FIG. 7 is a flow chart illustrating a method for providing upstream data transfer in a data communication system.
Figure 8:
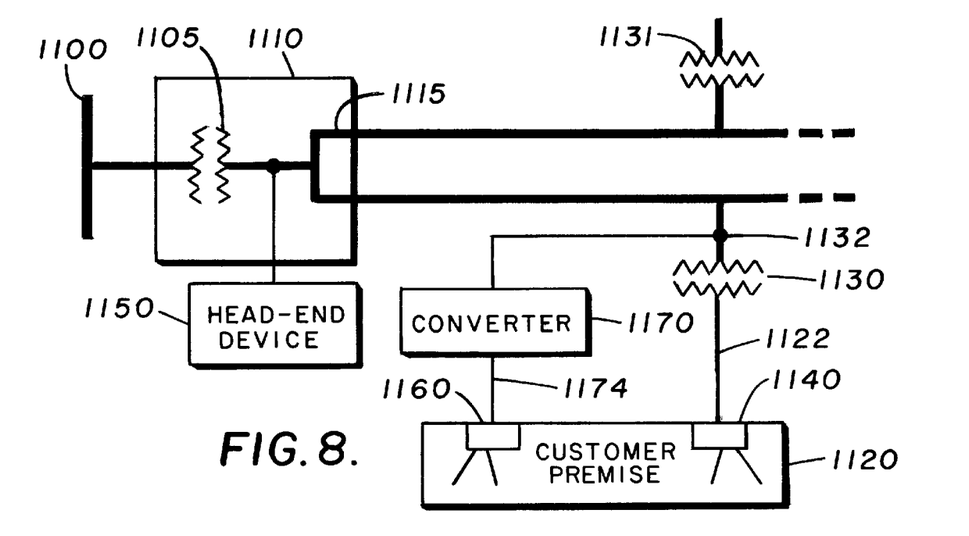
FIG. 8 is a schematic of a power distribution network and a radio-frequency system in accordance with the present invention.

When information is transferred from the customer location to the distribution center, the method of transferring as shown in FIG. 7 begins when a remote modem receives data from the customer terminal, step 710. Next the data is converted by the modem to an upstream RF signal, step 720. The upstream RF signal is then coupled from the remote modem to the high-voltage cable, step 730. After the upstream RF signal travels from the customer location to the distribution center, the upstream RF signal is coupled to the distribution modem, step 740. The distribution modem then converts the upstream RF signal to data, step 750. The data contained in the upstream RF signal is then sent to the distribution data equipment for processing as a signal from the customer location.

The multimedia communication system in accordance with the present invention is full-duplex data service and is capable of providing multiple source interactive broadband service. The multimedia communication system as described above is a new communication technology which allows for two-way transmission of voice, data, and video over the high-voltage cables of a power system network. Because the power network is currently coupled to millions of households throughout the world, the new communication technology can become operational by installing the modems, high-voltage couplers, head-end or distribution equipment, and remote interfaces, and by appropriately conditioning the power loads by RF isolation means. It is the purpose of the present invention to provide an alternative to the contending technologies discussed in current research journals and standards organizations. In addition, the communications system will allow for a new use of the high-voltage cables of a power network, thus enabling the power companies to compete as providers of multimedia services. This new of high-voltage cables will be particularly useful in rural areas and in developing countries having a power distribution network and little telecommunications infrastructure. When deployed over the existing power system cabling, the new communications system will allow fast access of service to some persons for whom the services are presently unavailable.

Coupling to the High-Voltage Cable

Figure 9:
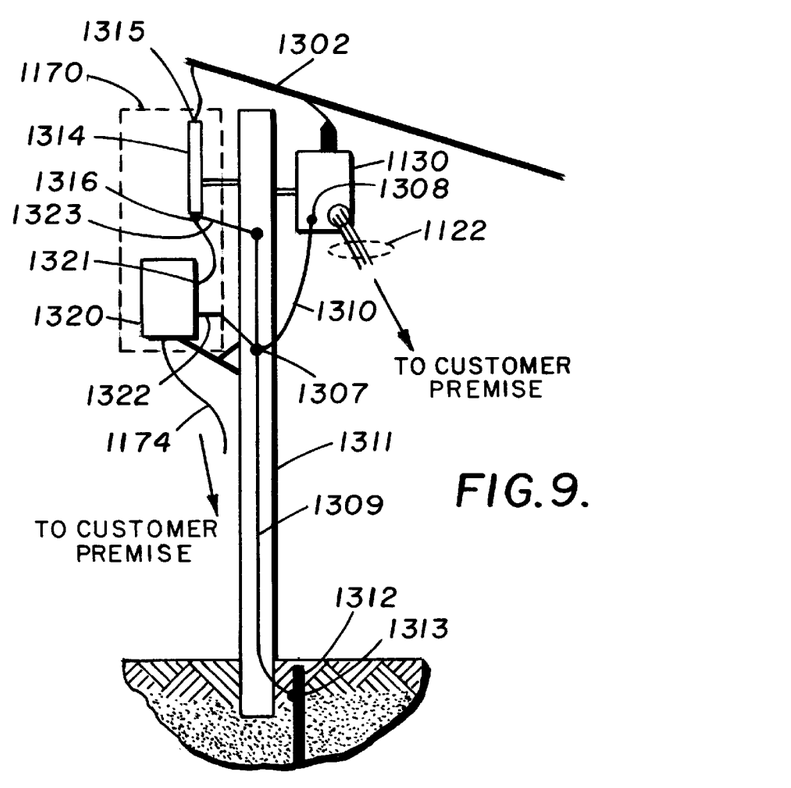
FIG. 9 is an illustration of a coupler in accordance with the present invention.

An electrical power network is comprised of generators, transformers, transmission lines, and other components. A power distribution network is a part of an electrical power network that couples electrical energy to customers. FIG. 9 illustrates a power distribution network having additional components serving to provide for two-way high-speed data transfers. A transmission network 1100 furnishes a transmission voltage, typically 69 Kilovolts ("KV") or greater, to a transmission transformer 1105, at a distribution substation 1110, for converting the transmission voltage to a distribution voltage, typically around 4 to 15 KV. The distribution voltage is then distributed as electrical energy over distribution cables 1115 to a customer premise 1120. The distribution cables are typically three cables, where each cable has one phase of a three phase voltage system. Each phase of the distribution voltage is reduced to approximately 120 volts by the step-down action of a distribution transformer 1130 for delivery to the customer premise. The voltage at the customer premise, such as a residence, is typically a three-wire single phase voltage and is coupled to the customer premise over a residential cable having three electrical wires 1122. The voltage delivered over the three electrical wires 1122 is coupled to a distribution box 1140. The distribution box has circuit breakers and terminals for distributing electrical power within the residence. The sole use of the power distribution network, not having the additional elements, is to deliver electrical power to the customer premise.

Still referring to FIG. 9, there is shown a head-end device 1150 coupled to a gateway 1160 by a converter 1170. A converter cable 1174 and the distribution cable 1115 are elements in the coupling. The converter cable 1174 may be an optical fiber, a coaxial cable, a twisted pair or similar conductors. The head-end device 1150 transmits and receives radio-frequency ("RF") signals to and from the gateway 1160. When the RF signals are modulated with data using modem techniques the head-end device 1150 and the gateway 1160 serve as components of an interactive broadband system ("IBS"). Elements connected within the customer premise 1120 to the gateway 1160 may include a telephone, a computer, a television, a security system and other such devices. The types of services that may be delivered over the IBS are numerous and have been described in public literature, such as trade magazines, technical society journals, internet sites, and other sources. It is the objective of the present invention to provide a communication system that meets existing and future communication needs of IBS providers and customers. Another objective of the present invention is to provide an IBS that efficiently uses elements of the power system as elements of a communications system. Still another object of the present invention is to provide a system that is expandable without the requirement of installing coaxial cable, fiber, or other transmission channel elements.

The system for providing data communication service to the customer premise as shown in FIG. 9 may be modified to provide station-to-station communications for internal use of a power company. In addition the data communication system of the present invention may serve as part of a control and monitoring system for a power network or power grid. In order for the system to provide data communications functions for the power industry additional system elements may be needed, such as blocking elements to cancel the interference problems in a hub arrangement and RF repeaters to boost signal levels.

Figure 10:
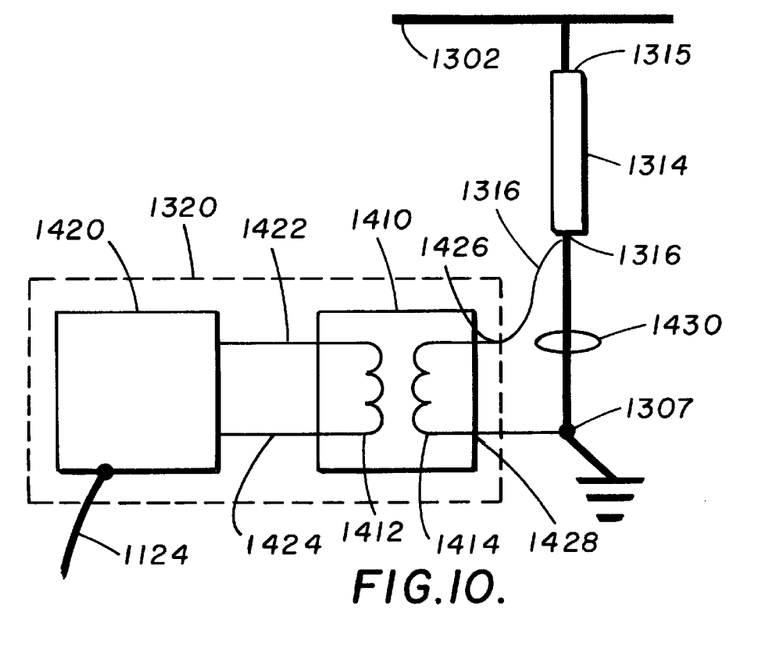
FIG. 10 is a detailed illustration of an embodiment of a radio-frequency coupler in accordance with the present invention.

The converter 1170 for providing broadband services is illustrated in FIG. 10. The converter is used to transfer a RF signal, typically having frequencies in a one to sixty Megahertz range, between the head-end device 1150 and the gateway 1160. The range of frequencies for RF signals of the present invention may be in various regions of the VHF and UHF bands. A high-voltage cable 1302 of the distribution cable 1115 is coupled to a single phase distribution transformer 1130. The distribution transformer provides single phase, 3 wire power for residential service using power wires 1122. A transformer grounding terminal 1314 is coupled to a grounding wire 1309 by a heavy gauge copper wire 1310. The point where the grounding wire 1309 and the transformer grounding wire 1310 are coupled is called the neutral node 1307. The grounding wire 1309 is secured to a support pole 1311 and is attached to a grounding rod 1312 at the bottom of the support pole. The point where the grounding wire 1309 and the grounding rod 1312 are coupled is referred to as the ground node 1313. All the elements described above are part of a typical electrical connection for providing electrical service to a customer premise 1120.

Also connected to the high-voltage cable 1302 is a lightning arrester 1314. The high-voltage terminal of the arrester 1315 is connected to the high-voltage cable 1302 by an electrical conductor, such as a piece of copper wire. The grounding node of the arrester 1316 is connected to the grounding conductor 1309 by another conductor 1323. An RF signaling device 1320 has an RF output terminal 1321 coupled to the grounding node of the arrester 1316. A RF reference node 1322 of the RF signaling device 1320 is connected to the neutral node 1307. A head-end device RF transmitted signal is coupled to the RF device 1320 using the RF impedance characteristics of the arrester. Although arresters are typically placed on power poles for lightning protection, the capacitance of the arrester is large enough to couple an RF signal. It has been determined that the capacitance of an arrester typically has values between 1 picofarad and 170 picofarads. The wide range of values for the capacitance of an arrester is due to the variety of manufacturing techniques and structures.

Figure 11:
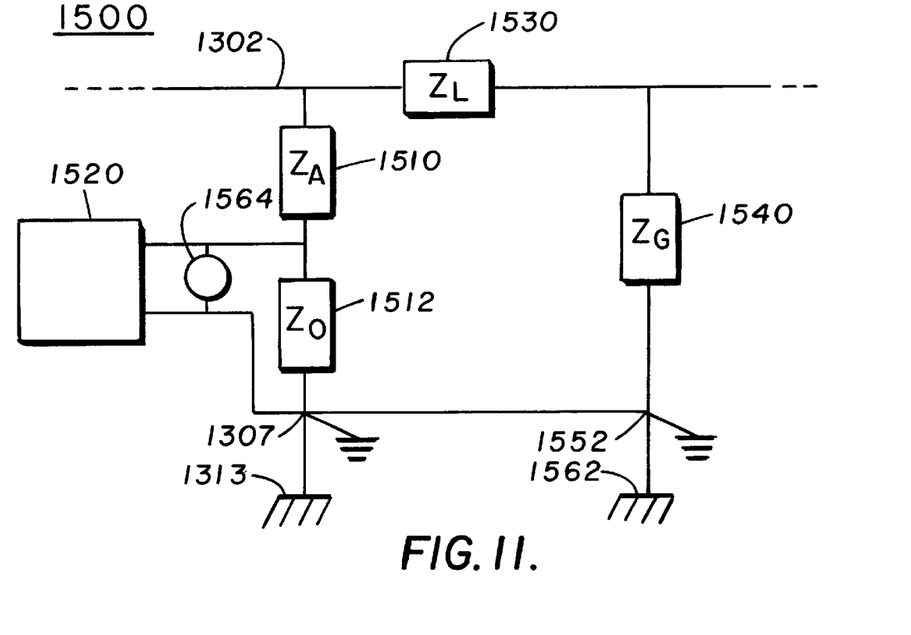
FIG. 11 is an equivalent circuit an embodiment of a radio-frequency coupler in accordance with the present invention.

FIG. 11 illustrates the structure for coupling the RF signaling device 1320 to the high-voltage cable 1302. The RF signaling device is comprised of a RF modem 1420 coupled to a RF transformer 1410. A first coupling wire 1422 and a second coupling wire 1424 connect the RF modem to a primary winding 1412 of the RF transformer. A secondary winding 1414 of the RF transformer has an output terminal 1426 connected to the low-voltage terminal of the arrester 1316 and a neutral terminal 1428 connected to the neutral node 1307. In order to increase the RF impedance on the piece of grounding cable 1309 between the low-voltage terminal of the arrester 1316 and the neutral node 1307, a ferrite core 1430 may be placed around the grounding cable. The use of RF transformer 1410 is not required in order to couple the RF modem to the arrester in accordance with the present invention. However the RF transformer does serve as protection mechanism by providing an alternate path to ground if ground cable 1309 is disconnected and the transformer further serves to provide impedance matching. Although the arrester 1314 is used as an element in the coupling apparatus of the present invention, the use of a high-voltage capacitor or other high-voltage RF coupler, such as an adaptive coupler, could serve in place of the arrester. The RF couplers of the present invention will pass high-frequency signals, but will block low-frequency signals, thereby providing low-frequency isolation. An electrical circuit equivalent of the coupling arrangement of FIG. 11 is shown In FIG. 12.

Because arresters are considered to be a large impedance to any signal normally found on the high-voltage cable 1302, the inventor believes that this novel use of the arrester is unique. In addition the inventor believes that a modified lightning arrester could be developed which could serve as an arrester and an RF coupler. Such a modified lightning arrester would result in a novel electrical element having improved coupling characteristics, but could be fabricated or manufactured using methods similar to those used in making existing lightning arresters. It is also not obvious that the grounding cable 1309, a low impedance to typical power system voltages, may serve as an impedance element for a RF coupling circuit, Because the components of the present invention are installed on existing power distribution networks it may be necessary to add ferrite cores or similar elements to adjust RF impedances. This adjusting of RF impedances is necessary to obtain satisfactory RF coupling.

In addition to receiving RF signals from the head-end device 1150, the RF modem 1420 may also transmit a modem transmit signal. The modem transmit signal is coupled through the RF transformer 1410, the lightning arrester 1314, and the high-voltage cable 1302 to the head-end device 1150. The modem transmit signal is used to transfer information to the head-end device 1150 from the customer premise. Because the converter 1170 transfers RF signals, modulated with data, in both directions, the present invention may be used to provide IBS.

An equivalent circuit 1500 of an embodiment of an RF coupling circuit in accordance with the present invention is illustrated in FIG. 12. A translated RF modem 1520 is an equivalent of the RF modem 1420 transformed to the secondary of the RF transformer. The output impedance, $Z_O$, 1512 is the impedance between the bottom of the arrester and the neutral node 1307. An arrester impedance, $Z_A$, 1510 is the equivalent impedance of the arrester to an RF signal. The line impedance, $Z_L$, 1530 represents the impedance of the high-voltage cable 1302 to an RF signal. Connected to one side of the line impedance is a ground impedance, $Z_G$, 1540 representing RF impedance to ground. The neutral node 307 is coupled to a remote neutral node 1552. The ground node 1313 is coupled to a remote ground node 1562 by grounding rods driven in the earth, A gas discharge tube 1520 is placed across the terminals of the translated RF modem 1520 as a safety device to warn of a faulty circuit. The gas discharge tube acts as an open circuit unless an overvoltage appears across the terminals of the output impedance 1512.

When an incoming RF signal from the head-end device 1150 is placed on the high-voltage cable 1302, $Z_A$ and $Z_O$ serve as a voltage divider circuit. Hence a portion of the RF signal on the high-voltage cable is coupled to the translated RF modem 1520. Since only a portion of the incoming RF signal is received by the translated RF modem, other converters. When the translated RF modem 1520 transmits a modem transmit signal, $Z_A$ and the combination of $Z_L$ and $Z_G$ act as a voltage divider allowing a portion of the modem transmit signal to be received by the head-end device 1150. The output impedance, $Z_O$, 1512 serves as a driving point impedance when the RF modem transmits a signal. The equivalent circuit of $Z_O$ to an RF signal may be a few microhenries in series with 10 to 30 ohms. Although it is difficult to model $Z_A$, an equivalent impedance of 1 to 150 picofarads in parallel with several megaohms is a workable engineering approximation. The equivalent impedance of both $Z_L$ and $Z_G$ may have a very wide range of values, depending on the length of the line and the location and number of distribution connections. In addition to wide variations in the impedances of the equivalent circuit due to the distribution network structure, environmental conditions, such as temperature and humidity may also cause these impedances to change. The equivalent circuit 1500 as illustrated in FIG. 12 may be used by those skilled in the art, applying mesh or nodal analysis in conjunction with transmission line equations, to determine the transmission characteristics of the IBS provided by the present invention.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims:

We claim:

1. A multimedia communications system for providing an interactive broadband service between a distribution center and one or more remote locations where a high-voltage cable of an electrical power distribution system serves as a communication channel, the multimedia communications system comprising:

at the distribution center;
a media source with a media signal where the media signal has two or more types of information;
a distribution modem for receiving and modulating the media signal forming a radio-frequency signal where the distribution modem has a first terminal for coupling the radio frequency signal to the high-voltage cable and a second terminal connected to a neutral node at the distribution center;
a first coupler having one terminal connected to the first terminal of the distribution modem and a second terminal connected to the high-voltage cable; and at the remote location;
a second coupler having a first terminal connected to the high-voltage cable and a second terminal for coupling and directing the radio-frequency signal from the distribution center to a remote modem, where the remote modem provides the media signal as an output.

2. The multimedia communications system of claim 1 wherein the media signal contains a video signal, a data signal, and a telephone signal.

3. The communications system of claim 1 wherein the radio-frequency signal operates at frequencies between 1 MHz and 1000 MHz.

4. The communications system of claim 1 wherein the radio-frequency signal operates between 11 MHz and 1000 MHz.

5. The communications system of claim 1 wherein a filter is placed on the high-voltage cable between the first coupler and a distribution substation of the electrical power distribution system to prevent the radio-frequency signal from being coupled to the distribution substation transformer.

6. The communications system of claim 1 wherein a bandstop filter is placed at each non-communications load on the high-voltage cable to improve communications efficiency.

7. The communications system of claim 1 wherein isolation devices are placed on pole ground conductors below the neutral conductor connection.

8. The communication system of claim 1 wherein the remote location has a transmitter in the remote modem for transmitting information to the distribution site.

9. The communication system of claim 1 wherein the modulation method of the distribution modem is discrete multitone modulation.

10. The communication system of claim 1 wherein the modulation method of the distribution modem is pulse amplitude modulation.

11. The communication system of claim 1 wherein the modulation method of the distribution modem is quadrature amplitude modulation.

12. The communication system of claim 1 wherein the modulation method of the distribution modem is carrierless amplitude-modulation phase-modulation.

13. The communication system of claim 1 wherein a plurality of simultaneous communications channels are operated over the high voltage cable at different frequencies.

14. A method for providing an interactive broadband service between data distribution equipment at an electrical power distribution center and one or more remote locations where a high-voltage cable of the electrical power distribution system having a neutral wire connected between neutral nodes serves as a communication channel, the method comprising:

providing a media signal to a distribution modem;

modulating the media signal, thereby generating a radio-frequency signal having frequencies greater than 500 KHz;

coupling the radio-frequency signal to the high-voltage cable where the neutral wire of the electrical power distribution system serves as a return path for the radio-frequency signal;

receiving the radio-frequency signal at a remote location; and demodulating the radio-frequency signal to provide a media signal to the remote location.

15. The method of claim 14 wherein the radio-frequency signal contains frequencies between 1 MHz. and 1000 MHz.

16. The method of claim 14 wherein the radio-frequency signal contains frequencies between 11 MHz. and 1000 MHz.

17. The method of claim 14 comprising the additional steps of:

blocking the radio-frequency signal from being coupled to a distribution substation of the electrical power distribution system;

blocking the radio-frequency signal from being coupled to non-communications loads of the high voltage power distribution circuit; and blocking the radio-frequency signals from being conducted to earth ground via the pole ground conductors.

18. The method of claim 14 further comprising the steps of:

measuring channel characteristics and impairments;

storing the channel characteristics and impairments in the distribution data equipment; and determining the best frequency band assignments for the radio-frequency signal.

* * * * *